A. M. TODD.
OBTAINING MENTHOL.
No. 10,705. Reissued Mar. 30, 1886.
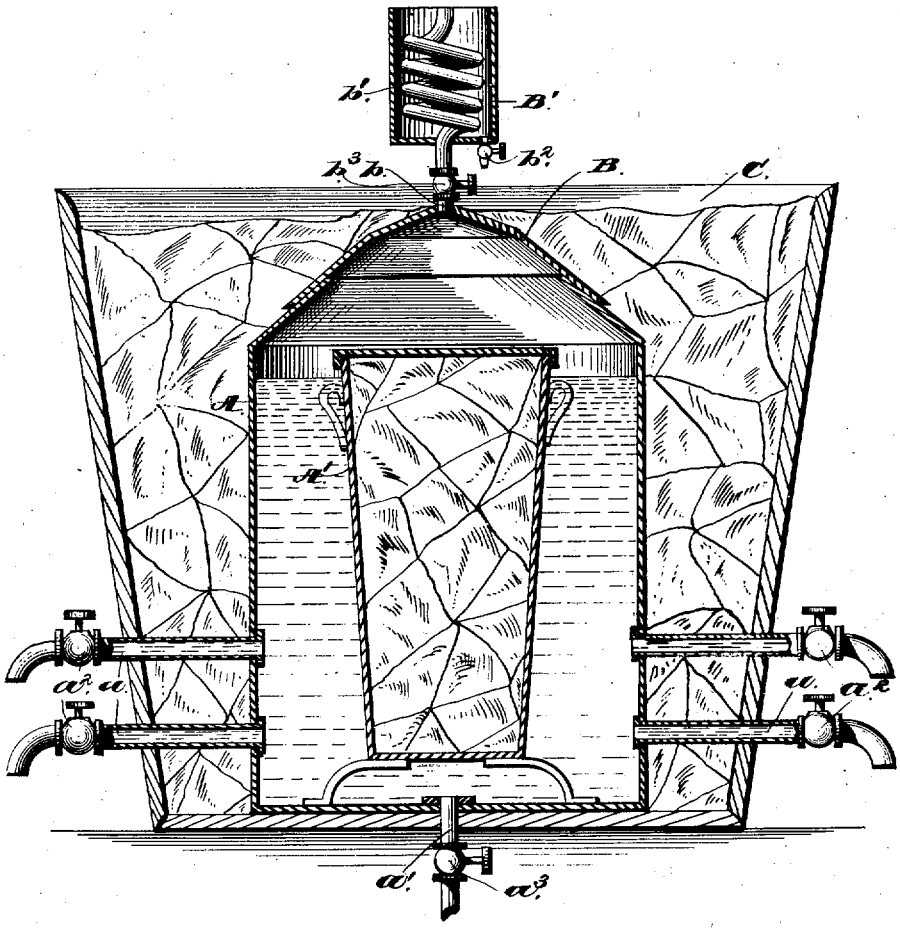
Witnesses:
Charles S. Hyer
Edward L. Miller
Inventor:
Albert M. Todd.
By Fennerstle
Atty.

UNITED STATES PATENT OFFICE.

ALBERT M. TODD, OF NOTTAWA, MICHIGAN.

OBTAINING MENTHOL.

SPECIFICATION forming part of Reissued Letters Patent No. 10,705, dated March 30, 1886.

Original No. 330,274, dated November 10, 1885. Application for reissue filed February 12, 1886. Serial No. 191,671.

*To all whom it may concern:*

Be it known that I, ALBERT M. TODD, a citizen of the United States, residing in the village of Nottawa, in the county of St. Joseph and State of Michigan, have invented a new and useful process for producing, isolating, and perfecting a highly-concentrated crystalline product from the essential oil of the true peppermint-plant (*Mentha piperita*,) which essential oil is scientifically designated "*oleum menthæ piperitæ*," of which the following is a specification.

My invention relates to a process of treating the essential oil of the true peppermint-plant, (*Mentha piperita*,) by which a crystalline product is obtained therefrom, and also to said crystalline product; and it consists of certain steps, which will be hereinafter more fully described, and pointed out in the claim.

The object of my invention is to produce crystals from the oil of *Mentha piperita*, which shall contain all of the valuable properties of said oil in a concentrated form, in which form they will remain at any ordinary temperatures and be capable of being incorporated into solid compounds, where a fluid is inadmissible, such as cones, migraine pencils, &c.

In carrying out my invention I use the apparatus illustrated in the accompanying drawing, which is a sectional view thereof, or any apparatus similar thereto.

Referring to the drawing, A represents a metallic tin coated or lined tank, in which the oil to be operated upon is placed. Inside of this tank A is placed a second tank, A′, of smaller dimensions, to hold a freezing-mixture of salt and ice.

On the top of the metal tank A is placed a removable cover, B, which has an air-pipe, *b*, attached thereto to admit the air, which is coiled, as *b′*, in a condenser, B′, having a petcock, $b^2$, to admit of the ingress of air when desired. The tank A, with its internal tank, A′, is to be placed in an outer or wooden vessel, C, which is also adapted to contain a freezing-mixture of salt and ice.

Extending from the sides and bottom of the tank A are pipes *a a* and *a′*, passing through the outer vessel, C, and having faucets or check-valves $a^2$ $a^2$ and $a^3$, by means of which the oil is allowed to gradually drain off after the crystals are formed. If the apparatus is thus arranged, the first step of my process, or that of forming the crystals, will be as follows:

After having purified the essential oil by fractional distillation, it is allowed to cool down by being placed in any cool receptacle until it reaches to about 40° Fahrenheit. It is then poured into the tank A and around the freezing-mixture tank A′, which has previously been filled with the mixture of salt and ice. The cover B′ is placed on said tank A′, and the outer vessel, C, filled with a like freezing-mixture of salt and ice. These freezing-mixtures are in the proportion to the volume of oil acted upon as in the ratio of six to one—that is, I take about fifteen hundred pounds of ice and three hundred pounds of salt to semi-solidify or crystallize three hundred pounds of oil. The apparatus is thus left, being continually replenished with freezing-mixture until a temperature of from 5° above to 8° Fahrenheit below zero is reached, when the oil will have changed into a semi-solid or jelly-like mass and the crystals be formed.

I have discovered that the oil, when congealed to a jelly, as above described, contains crystals, although not really apparent, but which may be brought out and made to appear by draining off so much of the mass as still remains in a fluid condition. In order to effect such drainage, pipes *a a* and *a′*, with faucets or valves $a^2$ $a^2$ and $a^3$ in tank A, in the sides near the bottom and in the bottom thereof, are therefore provided, the faucets $a^2$ $a^2$ and $a^3$ of said pipes remaining closed while the process of congealing or crystallizing the oil is progressing. When the crystals are formed or the mass is solidified sufficiently to offer a considerable resistance to efforts used to penetrate or remove it, the faucets and the valve $b^3$ in air-pipe *b b* are opened and the oil allowed slowly to drain off. This draining is allowed to continue for a period of about three days, or until all the oil is drained therefrom, and at a uniform temperature of from zero to 4° Fahrenheit.

I also found that the displacing-power of attraction of gravitation was admirably adapted to perform the isolating process, since it would remove the fluid portion through the medium of the faucets, and yet in so gentle a manner as not to seriously disturb or disintegrate the delicately-formed crystals, which, being yet moist and imperfect, could not offer sufficient resistance to strong force or pressure, and that by the ingress of air from above a vacuum was prevented from being formed, and a consequent destruction of the crystals.

Previous to the isolation of the crystals by drainage, the check-valve $b^3$ is closed to prevent the outside warm air from entering upon the surface of the cooled oil. When the isolating process is begun, however, the check-valve $b^3$ is opened and the air allowed to gradually enter and fill the space between the surface of the crystals and the under surface of the cover, so as to prevent a vacuum being formed at this point as the oil is drained out from the under surface of the crystals.

The third step of my process is to harden or perfect the crystals, which may be done in either of two ways. After such fluid portion has escaped, or as much thereof as is likely to escape readily at or near the temperature at which the separation was commenced, it is then allowed from seven to fourteen days to gradually and slowly rise in temperature, with renewed or continuous drainage, until about 90° Fahrenheit is reached—a point at which the mass will not reliquefy. The crystals are now allowed to stand at this test-temperature until little or none of the liquid will settle or deposit, when they should be found dry and hard at ordinary temperatures, and the process may be pronounced completed.

Another process of hardening is as follows: After such liquid portion has departed, or all of it which seems likely to do so at the temperature, as before stated, the crystals are then fused by application of warm water of a temperature of about 60° Fahrenheit while the mass is still cold. It is then subjected to a second congealing, crystallization, and isolation, as at first, and usually drying and perfecting them after this recrystallization, substantially as the first-mentioned process. By this recrystallization greater solidity and compactness of the product is secured without compression.

It is obvious that the times and temperatures in my process will vary as the proportion of the oil to be acted upon is varied, as also the surface and nature of the containing-vessel.

The apparatus I have illustrated is adapted for commercial manufacture, but various forms and sizes of vessels can be used at will with as equal efficiency as the one described.

The residuum or drained-off oil can be reoperated upon, in like manner as when it was first put into the apparatus, with like results.

By my process of crystallization of the essential oil of peppermint I obtain a product that is valuable in commerce, and one which can be easily handled and incorporated into compounds in which a liquid is inadmissible, and thereby gain a useful article for the use of chemists and the public generally.

Having thus described my process, what I claim as new, and desire to secure by Letters Patent, is—

1. The process of obtaining a crystalline product from the oil of *Mentha piperita* by first congealing it or rendering it in a semi-solid or jelly-like form, then separating or isolating it by gradually draining off the oil therefrom, and, thirdly, perfecting or hardening the crystalline mass by fusing the crystals and subjecting to a second congealing and a gradual raising in temperature, substantially as and for the purposes specified.

2. The process of obtaining a crystalline product from the oil *Mentha piperita* by first congealing or rendering it into a semi-solid or jelly-like form, then isolating the crystalline portion by separating the oil therefrom, and, thirdly, perfecting or hardening the crystalline product by a gradual raising in temperature, substantially as described.

3. The process of obtaining a crystalline product from the oil *Mentha piperita*, which consists in first congealing it into a semi-solid or jelly-like form, then isolating the crystals by separating the fluid portion thereof by drainage at a temperature at or below freezing, substantially as described.

4. The hereinbefore-described concentrated and crystalline product, obtained, as stated, from the oil of *Mentha piperita* fusible only at high temperatures, and having the properties of remaining dry and hard and of not liquefying at ordinary atmospheric temperatures.

In testimony whereof I affix my signature in presence of two witnesses.

ALBERT M. TODD.

Witnesses:

CHARLES S. HYER,

L. SEWARD BACON.